United States Patent [19]

Gasperi et al.

[11] Patent Number: 4,762,007
[45] Date of Patent: Aug. 9, 1988

[54] TORQUE MEASURING APPARATUS

[75] Inventors: Michael L. Gasperi, Caledonia; Glen Ray, Big Bend, both of Wis.

[73] Assignee: Allen-Brady Company, Inc., Milwaukee, Wis.

[21] Appl. No.: 16,084

[22] Filed: Feb. 18, 1987

[51] Int. Cl.⁴ .............................................. G01L 3/10
[52] U.S. Cl. .................................................. 73/862.34
[58] Field of Search ............ 73/862.33, 862.34, 862.08

[56] References Cited

U.S. PATENT DOCUMENTS

| | | |
|---|---|---|
| 2,200,103 | 5/1940 | Shutt . |
| 2,349,663 | 5/1944 | Lnager . |
| 2,621,514 | 12/1952 | Waugh . |
| 3,191,434 | 6/1965 | Brunner et al. . |
| 3,501,758 | 3/1970 | James et al. . |
| 3,505,865 | 4/1970 | Kihlberg et al. .................. 73/862.34 |
| 4,136,559 | 1/1979 | Brown . |
| 4,449,117 | 5/1984 | Fortescue . |
| 4,513,628 | 4/1985 | Kohama et al. . |

FOREIGN PATENT DOCUMENTS

| | | | |
|---|---|---|---|
| 0093925 | 5/1986 | Japan ................................. | 73/862.08 |
| 131768 | 5/1951 | Sweden . | |
| 0857750 | 8/1981 | U.S.S.R. ........................... | 73/862.08 |
| 1180711 | 9/1985 | U.S.S.R. . | |

*Primary Examiner*—Charles A. Ruehl
*Attorney, Agent, or Firm*—Quarles & Brady

[57] ABSTRACT

A system for measuring the torque on a shaft has two resolvers coupled to the shaft at two spaced locations. The first resolver is excited in a conventional manner. The output coils of the first resolver are connected to what are conventionally the output coils of the second resolver. What is conventionally the excitation coil of the second resolver is coupled to a demodulator which produces a signal proportional to the sine of the difference between the angular position of the shaft at the two resolver locations.

10 Claims, 1 Drawing Sheet

TORQUE MEASURING APPARATUS

The present invention relates to devices for measuring the torque on a shaft and particularly to such devices which provide an electrical signal indicating the measured torque.

BACKGROUND OF THE INVENTION

When a shaft is used to transfer power from a motor to a driven device, the shaft undergoes torsion. As the load exerted by the driven device changes, the torque on the connecting shaft also varies. In many applications it is desirable to measure the torque in order to determine the magnitude of the load. For example, if the driven device is the socket of a pneumatic wrench, it is desirable to measure the torque on the shaft driving the socket to derive the amount of force being exerted on the nut being tightened. This enables one to determine when the nut is properly tightened.

Manual torque wrenches often provided a scale divided into units of force and a pointer indicating the current amount of torque being exerted by the wrench. Another type of manual wrench includes a dial for setting a given amount of torque which when exerted by the wrench a mechanism releases the socket from being driven any further by the handle of the wrench. Neither of these mechanisms incorporated in manual wrenches lends itself to power wrenches for use by robot controlled fastening systems. Not only is an optically read scale impractical for such systems, but the robot may have to tighten a number of fasteners to different amounts of torque making the dial and break type torque wrench also impractical.

Various types of electrical torque measuring systems have been developed. One class of such devices utilizes two alternating current electrical generators positioned at different locations along the driven shaft. An example of such a system is shown in U.S. Pat. No. 2,621,514 entitled "Phase Shift Torque Meter". In this type of device under a no load condition in which the shaft does not have any torque applied to it, the two generated alternating currents are in phase. As torque is developed on the shaft, the two alternating currents shift in phase by an amount that is proportional to the magnitude of torque. A similar system produces two pulsed waveforms which vary in phase with the applied torque.

Another type of torque measuring system employs two L-shaped arms fastened at two locations along the shaft and extending toward each other providing a small gap between the two free ends of the arms. At the end of one arm is a permanent magnet and the end of the other arm holds a Hall effect generator. An example of a device of this type is shown in U.S. Pat. No. 3,191,434 entitled "Device for Measuring Torque on Shafts". Under a no-load condition, the output signal from the Hall generator of this device will be zero. As soon as the magnet is displaced with respect to the Hall generator, as occurs when the shaft is under load, the Hall generator will produce a voltage that is proportional to the torque on the shaft.

SUMMARY OF THE INVENTION

The device for measuring torque of an elastic member includes two angular position transducers located at two locations on the elastic member. Each transducer has a primary winding and two secondary windings. Each of the transducers also has a rotor which provides electromagnetic coupling between the primary and secondary windings of the transducer. Each of the secondary windings of the first transducer is connected to one of the secondary windings of the other transducer. A means for providing an excitation signal is coupled to the primary winding of the first transducer. The primary winding of the second transducer is connected to a means for demodulating a signal produced at that winding.

One object of the present invention is to provide a mechanism for measuring the torque on a member which provides an electrical signal indicating the magnitude of the torque. Another object of the invention is to provide a mechanism for generating such a torque indication signal without employing complex phase comparison circuitry. A further object is to provide a torque measuring device without having to make electrical coupling between a rotating shaft and a non-rotating member.

DETAILED DESCRIPTION OF THE INVENTION

Figure 1:
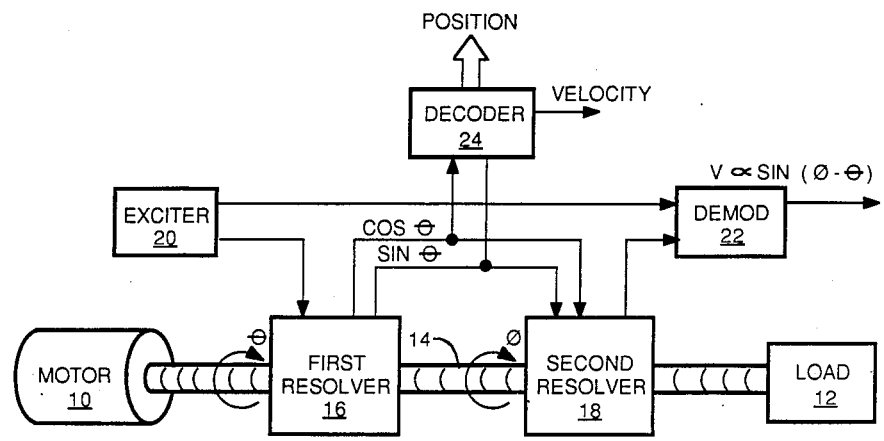
FIG. 1 is a schematic representation of a torque measuring system according to the present invention.

With initial reference to FIG. 1, a motor 10 is connected to a load 12 by a shaft 14 extending therebetween. As the amount of force exerted on the shaft by the load changes, the amount of torque on the shaft varies proportionally. Since the shaft is elastic, the torque will produce a slight twist in the shaft. If the degree of the twist is relatively small, the amount of twist will be proportional to the torque and hence the force being exerted by the load 12.

The torque measuring system shown in FIG. 1 incorporates two commercially available resolvers 16 and 18 such as those conventionally used to determine the angular position of a shaft. For example, each resolver has a primary coil wound on its rotor and two secondary coils spaced at 90 degrees with respect to each other around the resolver's stator. However, other types of angular positions transducers, such as the resolver disclosed in U.S. patent application Ser. No. 946,838, filed on Dec. 12, 1986 by Glen Ray or a three phase synchro, may be used for devices 16 and 18. The rotors of each of the resolvers are coupled to the shaft 14 at two different locations along the shaft. The distance between the two locations at which the resolvers are connected to the shaft is chosen so that the sine function of the difference in the angular position of the shaft at the two locations will be substantially linear from zero to maximum applied torque. The resolvers rotor shaft may be directly connected between two portions of the main shaft 14 or the resolver may be coupled via a gear or similar driving mechanism mounted on the main shaft.

The first resolver 16 has its primary or rotor coil connected to a conventional source 20 of a resolver excitation signal. For example, the excitation source 20 may produce a high frequency signal in the one to ten kilo-Hertz range which is applied to the primary coil of the first resolver 16. As the rotor of the first resolver spins in response to the rotation of the shaft 14, a signal is inducted from the excited primary coil into each of the secondary stator coils producing a high frequency signal on each of the secondary coils. Because of the 90 degree spacing of the stator coils, one output signal will lead the other by 90 electrical degrees. The leading signal is designated as representing the cosine of angular position of the shaft and the other signal is designated as the sine value. The coils of the resolver produce these signals are therefore conventionally referred to as the sine and cosine coils. The movement of the rotor modulates the induced signal on each of the secondary coils so that they have a sinusoidal envelope with an instantaneous amplitude corresponding to the respective trigonometric value. As is true with conventionally used resolvers, the phase angle of the sinusoidal envelope of the secondary coil signals corresponds to the angular position of the resolver's rotor, and therefore to the position of shaft 14.

Each of the secondary coils of the first resolver 16 is coupled to a different secondary coil on the stator of the second resolver 18. Specifically the sine coil of the first resolver 16 is coupled to what is conventionally designated as the sine coil of the second resolver 18. Similarly the cosine coils of the two resolvers 16 and 18 are also connected together. The output signal from each of the first resolver's secondary coils provides an excitation signal on each of the stator coils of the second resolver. Although in this connection scheme, the sine and cosine coils of the second resolver 18 are technically the primary coils in that excitation signals are applied to them, since these coils are customarily referred to as the secondary coils they will be referred to herein as the secondary coils. If three phase synchroes are used as transducers 16 and 18 the corresponding phase signal terminals of each device are connected together.

Figure 2A:
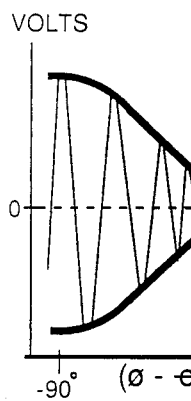
FIG. 2a is a graph showing the amplitude of the output signal from the second resolver of FIG. 1 as a function of shaft twist.

As the rotor of the second resolver 18 spins in response the rotation of the shaft 14, the sine and cosine signals from the first resolver 16 applied to the secondary coils of the second resolver 18 will induce a high frequency signal in the primary or rotor coil of the second resolver 18. As shown in FIG. 2a, the RMS amplitude of this signal is proportional to the sine of the difference between the angular position of the shaft at the two resolver locations. In other words, if theta ($\theta$) equals the angular position of the shaft at the first resolver 16 and phi ($\phi$) represents the angular position of the shaft at the second resolver 18, the output of the demodulator 22 will have a voltage proportional to the sine of phi minus theta. The difference in these two angles is the amount of twist for the shaft between the two resolvers.

In the simplest embodiment of the present invention this amplitude could be measured, by an A.C. voltmeter for example, to determine the amount of twist and hence the amount of torque on the shaft. However, as is apparent from the graph of amplitude versus twist in FIG. 2a, the curves are symmetrical about the zero twist line. Therefore, simply measuring the amplitude does not provide information as to the angular direction of the twist and the torque. In some applications, especially where the direction of shaft rotation is known, the direction information may not be required and this measurement approach is satisfactory.

Figure 2B:
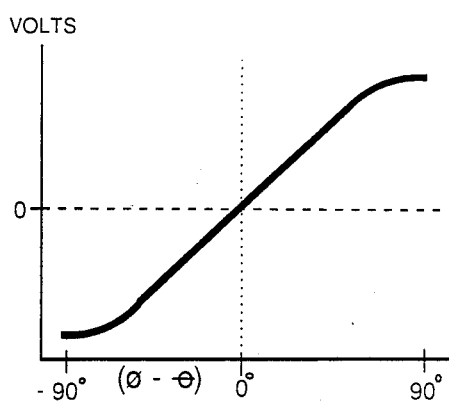
FIG. 2b is a graph showing the amplitude of the signal from the demodulator of FIG. 1 as a function of shaft twist.

The preferred embodiment shown in FIG. 1 incorporates a conventional synchronous demodulator 22 to detect not only the amount of torque but also its direction. The demodulator receives the output signal from the primary coil of the second resolver 18 and uses a timing signal from the exciter 20 to produce an output voltage which corresponds to the amplitude of the high frequency signal from the resolver 18. The ouput voltage from the demodulator as a function of shaft twist and, therefore, torque is shown in FIG. 2b. The magnitude of the voltage is proportional to $\sin(\phi-\theta)$ and the polarity of the voltage indicates the angular direction of the applied torque.

As the distance between the two resolvers is set so that the output signal from the second resolver will be substantially linear for all anticipated values of torque, the output signal will be proportional to the amount of torque exerted on the shaft and hence the amount of force exerted by the load. This single output signal may be used directly by additional processing circuitry. For example, this output may be employed to stop the motor when a predetermined amount of torque has been exerted.

When the torque sensing system is initially set up, one of the resolvers 16 or 18 is fixedly coupled to the shaft and the other resolver is not fixedly coupled to the shaft. The various electrical connections made and the system is then operated with the shaft stationary and without any applied torque. The second resolver is rotated until the lowest amplitude output signal is obtained from demodulator 22. The second resolver is then fixed to the shaft in this position. This procedure nulls the system's output under a zero torque condition.

A further feature of the present invention permits the derivation of shaft position and velocity information from the torque sensor. As shown in FIG. 1, a conventional circuit 24 for processing the output from a resolver receives the sine and cosine signals from the first resolver 16 and provides a digital number indicating the angular position of the shaft at the first resolver position and the velocity of the shaft. Any of several well-known resolver decoding circuits may be employed as device 24. One example of such a circuit is shown in U.S. Pat. No. 4,449,117 entitled "Encoder Tracking Digitizer Having Stable Output."

Figure 3:
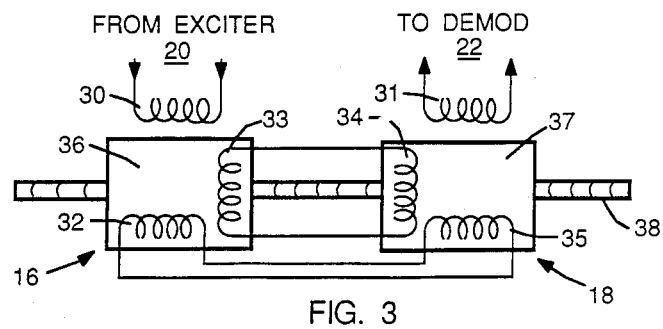
FIG. 3 is an alternative construction of the resolvers used in the present invention.

Although the present invention has been described using two separate resolvers, a custom device could be fabricated in which both resolvers were incorporated into a single enclosure. In the preferred implementation of this embodiment, shown schematically in FIG. 3, the resolvers 16 and 18 are built inside out with the primary coils 30 and 31 wound on the stator and the secondary coils 32-35 wound on the respective rotor cores 36 and 37. This combined device has a single shaft 38 on which two rotor cores 36 and 37 are mounted in magnetic isolation from each other. The rotor shaft 38 is coupled between two portions of the main shaft 14 and the torque is measured in terms of the twist of the rotor shaft between the two rotor cores. By winding the two sets of secondary coils on the rotor, they may be connected by wires running along the rotor shaft, thereby eliminating the need for brushes or transformers to provide external electrical connection to the rotor as in resolvers used conventionally to determine angular position. However, external connections to the secondary coils would be required if position or velocity information was desired.

We claim:

1. An apparatus for measuring torque of an elastic member comprising:
   a first resolver having a primary winding, two secondary windings, and a rotor coupled to the elastic member at a first position;
   means for applying an excitation signal to the primary winding of the first resolver;
   A second resolver having a rotor coupled to said elastic member at a second position, a primary winding, and two secondary windings each of which is connected to one of the secondary windings of said first means connected to the primary winding of the second resolver for determining the amplitude of the signal produced at that winding.

2. The apparatus as recited in claim 1 further comprising means connected to the secondary windings of said first resolver for determining the angular position of the elastic member at the first position.

3. The apparatus as recited in claim 1 further comprising means connected to the secondary windings of said first resolver for determining the angular velocity of the elastic member.

4. The apparatus as recited in claim 1 wherein said amplitude determining means comprises a synchronous demodulator 5. An apparatus for measuring torque of an elastic member comprising:
   a first resolver having a first coil means, a second coil means, and a rotor coupled to said elastic member at a first position and providing magnetic coupling between the first and second coil means;
   means for applying an excitation signal to the first coil means of the first resolver;
   a second resolver having a first coil means, a second coil means connected to the second coil means of the first resolver, and a rotor coupled to said elastic member at a second position and providing magnetic coupling between the first and second coil means; and
   means connected to the first coil means of said second resolver for determining the amplitude of the signal produced at that coil means.

6. The apparatus as in claim 5 wherein the second coil means of each resolver comprises sine and cosine signal coils.

7. The apparatus as in claim 5 wherein said determining means comprises a demodulator.

8. The apparatus as recited in claim 5 wherein the rotors of the two resolvers are mounted on the same shaft and the second coil means of each resolver is wound on the respective rotor.

9. An apparatus for measuring torque of an elastic member comprising:
   a first angular position transducer having a primary winding, two secondary windings, and a rotor coupled to the elastic member at a first position;
   means for applying an excitation signal to the primary winding of the first transducer;
   a second angular position transducer having a rotor coupled to said elastic member at a second position, a primary winding, and two secondary windings each of which is connected to one of the secondary windings of said first transducer;
   means connected to the primary winding of the second transducer for determining the amplitude of the signal produced at the winding; and
   means connected to the secondary windings of said first transducer for determining the angular position of the elastic member at the first position.

10. An apparatus for measuring torque of an elastic member comprising:
    a first angular position transducer having a primary winding, two secondary windings, and a rotor coupled to the elastic member at a first position;
    means for applying an excitation signal to the primary winding to the first transducer;
    a second angular position transducer having a rotor coupled to said elastic member at a second position, a primary winding, and two secondary windings each of which is connected to one of the secondary windings of said first transducer;
    means connected to the primary winding of the second transducer for determining the amplitude of the signal produced at that winding; and
    means connected to the secondary windings of said first transducer for determining the angular velocity of the elastic member.

* * * * *

UNITED STATES PATENT AND TRADEMARK OFFICE
CERTIFICATE OF CORRECTION

PATENT NO. : 4,762,007
DATED : August 9, 1988
INVENTOR(S) : Michael L. Gasperi et al.

It is certified that error appears in the above-identified patent and that said Letters Patent is hereby corrected as shown below:

In Column 3,
    at Line 4, Change "inducted" to --induced--.

In Column 6,
    at Line 34, change "to" to --of--.

Signed and Sealed this

Tenth Day of January, 1989

*Attest:*

DONALD J. QUIGG

*Attesting Officer*   *Commissioner of Patents and Trademarks*